(12) United States Patent
Bald

(10) Patent No.: US 9,296,137 B2
(45) Date of Patent: Mar. 29, 2016

(54) INJECTION MOLDING METHOD FOR MANUFACTURING A FUNCTIONAL PART HAVING A RECESS

(75) Inventor: Rolf Bald, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 703 days.

(21) Appl. No.: 13/516,132

(22) PCT Filed: Oct. 28, 2010

(86) PCT No.: PCT/EP2010/066292
§ 371 (c)(1),
(2), (4) Date: Aug. 27, 2012

(87) PCT Pub. No.: WO2011/072935
PCT Pub. Date: Jun. 23, 2011

(65) Prior Publication Data
US 2012/0315441 A1 Dec. 13, 2012

(30) Foreign Application Priority Data
Dec. 18, 2009 (DE) .......................... 10 2009 054 915

(51) Int. Cl.
| | |
|---|---|
| *B29C 45/14* | (2006.01) |
| *B29C 33/56* | (2006.01) |
| *B29C 45/16* | (2006.01) |
| *B29C 45/26* | (2006.01) |
| *B29C 45/40* | (2006.01) |

(52) U.S. Cl.
CPC ........... *B29C 45/14622* (2013.01); *B29C 33/56* (2013.01); *B29C 45/16* (2013.01); *B29C 45/261* (2013.01); *B29C 45/40* (2013.01); *Y10T 428/24521* (2015.01)

(58) Field of Classification Search
CPC .. B29C 45/14622; B29C 33/56; B29C 45/16; B29C 45/261; B29C 45/40; Y10T 428/24521
See application file for complete search history.

(56) References Cited

FOREIGN PATENT DOCUMENTS

| | | |
|---|---|---|
| AT | 328173 | 6/2006 |
| CH | 667 843 | 11/1988 |
| DE | 2 358 911 | 6/1974 |
| DE | 10 2005 020 037 | 11/2005 |
| DE | 60 2004 008 858 | 7/2008 |
| EP | 1 113 338 | 7/2001 |
| EP | 1 531 213 | 5/2005 |
| GB | 1 477 074 | 6/1977 |
| JP | 61 189913 | 8/1986 |
| JP | 63-239011 | 10/1988 |
| WO | WO 00/53965 | 9/2000 |
| WO | WO 02/081177 | 10/2002 |
| WO | WO 2006/000411 | 1/2006 |

OTHER PUBLICATIONS

International Search Report for PCT/EP2010/066292, dated Jan. 27, 2011.

*Primary Examiner* — Michael C Miggins
(74) *Attorney, Agent, or Firm* — Kenyon & Kenyon LLP

(57) ABSTRACT

An injection molding method for manufacturing a functional part having a recess, e.g., a borehole, includes a) injecting a first thermoplastic component into an injection mold, in the cavity of which a first mold core is situated, b) replacing the first mold core with a second mold core, the second mold core being smaller than the first mold core, and the second mold core being situated in the cavity formed in the first thermoplastic component by the first mold core in such a way that the second mold core is situated at a distance from the first thermoplastic component by an intervening space, c) injecting a second thermoplastic component into the space between the second mold core and the first thermoplastic component, and d) removing the second mold core.

9 Claims, 4 Drawing Sheets

INJECTION MOLDING METHOD FOR MANUFACTURING A FUNCTIONAL PART HAVING A RECESS

BACKGROUND OF THE INVENTION

1. Field of the Invention

The present invention relates to an injection molding method for manufacturing a functional part having a recess, e.g., a borehole for a hydraulic functional part of a motor vehicle.

2. Description of the Related Art

Units having hydraulic functions for the automotive sector, such as transmission hydraulic modules, transmission valve plates, ABS hydraulic units, and brake master cylinders, are primarily made of metals such as aluminum and steel due to the required precision of the long boreholes, and pistons and valves that are moved therein, and are made of plastics, for example duroplastics or thermoplastics, only in some areas. The component geometries necessary for the function have ribs, different wall thicknesses, and transverse holes which may result in warping, sink marks, and joint lines during filling with plastic molding compounds.

Although duroplastics have advantages over thermoplastics with respect to precision and dimensional stability over a wide temperature range, as well as with regard to swelling behavior in the operating materials, they exhibit severe burr formation in injection molding processing. After production, these burrs must be removed by blasting processes. This is difficult to ensure for larger parts having deeply recessed borehole cuttings, and results in soiling problems. The curing of the duroplastics required in the process prolongs the cycle time, and necessitates accurate testing of the curing behavior of the molding compound prior to processing, as well as specialized process control of the curing behavior. In addition, duroplastics have a higher density than thermoplastics.

Thermoplastics offer advantages with respect to freedom from burrs, more uniform and quicker processing, and a lower part weight.

However, because of the known disadvantages of thermoplastics, such as poorer dimensional stability, greater anisotropy in fiber reinforcement, swelling in operating materials such as brake fluid, transmission fluid, and automatic transmission fluid (ATF), as well as sink marks and geometric deviations of joint lines compared to metals and duroplastics, thermoplastic housings having hydraulically functional boreholes are usually not used.

The published German patent application document DE 60 2004 008 858 T2 describes a hydraulic unit which is manufactured by injection molding of a resin material, reinforcing elements being initially produced by injection molding, and being subsequently extrusion-coated with resin in a further injection molding step for manufacturing the housing. However, there is a risk that the reinforcing elements may be deformed by the large quantity of resin which is injected at high temperatures and pressures for manufacturing the housing.

BRIEF SUMMARY OF THE INVENTION

The subject matter of the present invention is an injection molding method for manufacturing a functional part having a recess, including the following method steps:
a) injecting a first thermoplastic component into an injection mold, in the cavity of which a first mold core is situated,
b) replacing the first mold core with a second mold core, the external dimension of the second mold core being smaller than the external dimension of the first mold core, and the second mold core being situated in the cavity formed in the first thermoplastic component by the first mold core in such a way that the second mold core is situated, in particular laterally, at a distance from the first thermoplastic component by a space in-between,
c) injecting a second thermoplastic component into the space between the second mold core and the first thermoplastic component, and
d) removing the second mold core, in particular with formation of the recess.

The present invention offers the option of greatly reducing the lack of precision of hydraulic boreholes made of thermoplastics, so that the necessary precision for a uniform hydraulic function (high degree of tightness between the piston and the borehole, low leakage, linear low-hysteresis control response) is provided over the temperature range (typically from $\geq -40°$ C. to $\leq 120°$ C. or $150°$ C.). Shape and position deviations (roundness, cylindricity), in particular for long boreholes in hydraulic functional parts, which result from shrinkage and warping may be advantageously eliminated by using the two-component technique. Precise cylindrical boreholes may thus be advantageously produced in plastic parts. In addition, large housings having complicated shapes may be provided with precise boreholes.

Using method step a), a base body in particular is initially produced from the first thermoplastic component. The injection mold specifies in particular the outer contour of the base body. The base body may have, for example, one or multiple ribs and/or different wall thicknesses and/or transverse holes. A shell made of the second thermoplastic component is subsequently produced in the base body in method steps c) and d). The functional part may be subsequently removed from the injection mold, in particular in a method step e).

A recess provided with the aid of the method according to the present invention may be a depression or an opening of any given shape and having any given cross-sectional areas, for example polygons, or essentially circular cross-sectional areas. This is not possible, or is possible only with great effort and cost, by mechanical machining.

In particular, the recess may be a single opening or a multiple opening. For example, the recess may be a multiple opening having a longitudinal area and one or multiple transverse areas which open into the longitudinal area, and/or one or multiple transverse areas which intersect the longitudinal area. For example, the recess may have a shape similar to a cross or a multiple cross, for example a double cross. Several types of first and second mold cores may be used to form this type of recess. For example, one first mold core and one second mold core may be used for forming the longitudinal area, and different first mold cores and second mold cores may be used for forming the transverse areas.

Within the scope of one specific embodiment, the second mold core is centrally situated in the cavity formed in the first thermoplastic component by the first mold core. For example, the second mold core may be centrally and coaxially situated in the cavity formed in the first thermoplastic component by the first mold core.

However, the recess may also be a single borehole or a multiple borehole, in particular a long single borehole or a long multiple borehole. Within the scope of the present invention, a borehole is understood to mean in particular a depression or an opening having a circular or noncircular cross-sectional area which is produced by an injection molding method. A "long borehole" is understood to mean a borehole whose length is greater than its diameter. For example, in a "long borehole" the ratio of the length of the borehole to the diameter of the borehole may be 4:1 to 10:1.

For example, the borehole may be a cylindrical single borehole or a multiple borehole. Thus, the borehole may have a depression or an opening having a circular cross-sectional area. For a multiple borehole, "cylindrical" in particular may be understood to mean that the individual boreholes of the multiple borehole are cylindrical, whereby the opening areas or intersection areas of the individual boreholes may have a different shape, for example in the form of a structure composed of two or more cylinder-like units which merge together.

In particular, the borehole may be a single borehole or a multiple borehole for a piston which is movable and freely rotatable along a borehole axis. For example, the recess may be a multiple borehole having a longitudinal hole and one or multiple transverse holes which open into the longitudinal hole, and/or one or multiple transverse holes which intersect the longitudinal hole. For a multiple borehole having this type of design, for example a fluid may flow into and/or out of the longitudinal hole, whereby the transverse holes may be completely or partially opened and/or closed by a piston which is movable in the longitudinal hole. For example, hydraulic volume flows and/or pressures may be controlled and/or regulated with the aid of multiple boreholes having this type of design.

To produce a cylindrical borehole, the first and second mold cores preferably have a cylindrical design, for example in the shape of cylinders or hollow cylinders. The outer diameter of the second mold core is preferably smaller than the outer diameter of the first mold core. In particular, the second mold core is centrally situated in the cavity formed in the first thermoplastic component by the first mold core. For example, the second mold core may be centrally and coaxially situated in the cylindrical cavity formed in the first thermoplastic component by the first mold core.

The functional part may also have multiple recesses or boreholes. In addition, the injection mold may be designed for manufacturing various different functional parts, and may be provided with a number of first and second mold cores which corresponds to the number of recesses to be produced.

Within the scope of another specific embodiment, the first and/or second mold core, in particular the first mold core, has/have a draft angle.

Within the scope of another specific embodiment, the first and/or second mold core, in particular the second mold core, has/have an anti-friction coating.

Within the scope of another specific embodiment, the distance between the cavity in the injection mold and the first mold core is greater than the distance between the cavity formed in the first thermoplastic component by the first mold core and the second mold core. In other words, the second thermoplastic component may have a smaller wall thickness than the first thermoplastic component or the shell may have a smaller wall thickness than the base body.

The first and second thermoplastic components may be the same or different.

Within the scope of another specific embodiment, the first and second thermoplastic components are different thermoplastic components.

Within the scope of another specific embodiment, the first thermoplastic component is optimized with respect to the structural mechanical requirements, in particular the stability, for example the temperature stability and/or pressure resistance and/or shape stability, and the second thermoplastic component is optimized with respect to the requirements for the borehole geometry, for example to compensate for sink marks, and for the field of application of the borehole, for example the functional parts to be moved therein such as pistons and fluids, such as hydraulic fluids. The higher degree of shrinkage theoretically to be expected in the areas of the second thermoplastic component at which the second thermoplastic component adjoins sink marks in the first thermoplastic component may advantageously be avoided in practice. Geometric inaccuracies of the base body, composed of the first thermoplastic component, caused by shrinkage, anisotropy, and joint lines, as well as fiber orientation may advantageously be compensated for in this way.

Within the scope of another specific embodiment, the first thermoplastic component includes fibers and/or other fillers, for example inorganic and/or organic fillers. In particular, the first thermoplastic component may be a fiber-reinforced thermoplastic component.

For example, the first thermoplastic component may include fibers selected from the group composed of glass fibers, carbon fibers, organic fibers, and mixtures thereof. The fibers may have an average fiber length, for example, of $\geq 50$ µm to $\leq 10$ mm, in particular $\geq 100$ µm to $\leq 7$ mm, for example $\geq 100$ µm to $\leq 200$ µm, and/or an average fiber diameter of $\geq 2$ µm to $\leq 15$ µm, in particular $\geq 5$ µm to $\leq 12$ µm, for example $\geq 6$ µm to $\leq 10$ µm. For example, the first component may include $\geq 10$ percent by weight to $\leq 70$ percent by weight, in particular $\geq 30$ percent by weight to $\leq 60$ percent by weight, for example $\geq 40$ percent by weight to $\leq 50$ percent by weight, of fibers and/or other fillers.

The second thermoplastic component may be optimized in particular with respect to the shrinkage behavior and/or the flow behavior and the tribological properties, such as wear and/or friction. The second thermoplastic component preferably has low shrinkage, in particular low isotropic shrinkage.

For example, by appropriately selecting polymer and fillers, the second thermoplastic component may be optimized so that it flows easily, and only low extrusion pressures, preferably of less than 100 bar, measured in the cavity of the second thermoplastic component, are necessary during filling of the mold with the second thermoplastic component. In this way, the mechanical load on the first thermoplastic component due to internal pressure during injection of the second thermoplastic component may be kept low.

Alternatively or additionally, the second thermoplastic component may be optimized in that no flashes develop on the contact surfaces of mold cores, for example the contact surface of a longitudinal hole mold and of a transverse hole mold. A reduction in the free diameter, and soiling of the system when the flashes are removed, may thus be avoided.

Alternatively or additionally, the polymer of the second thermoplastic component may be optimized in that the solidification heat of the melt is low. The cooling time, and thus also the cycle time, may be shortened in this way. In addition, the thermal load on the first thermoplastic component may be reduced.

Within the scope of another specific embodiment, the second thermoplastic component includes at least one liquid crystal polymer. Liquid crystal polymers (LCP) are available, for example, from Ticona under the trade name Vectra. Liquid crystal polymers are advantageously able to flow easily when there is high shearing and the cross sections of runner channels and the functional part are small. In addition, liquid crystal polymers may have the above-described properties such as freedom from burrs and low solidification heat.

Within the scope of another specific embodiment, the second thermoplastic component includes a mineral filling and/or a filling selected from the group composed of graphite, molybdenum disulfide, polytetrafluoroethylene, zinc sulfide, carbon fibers, aramide fibers, and mixtures thereof. In this way the recess may be lubricated, which may have an advantageous effect for the demolding forces during removal of the second core as well as for the subsequent use of the recess.

The functional part may be a hydraulic functional part, in particular a hydraulic unit, for example for a motor vehicle. The functional part is preferably designed for pressure transmission and/or for pressure control for pressures of ≥10 bar to ≤400 bar. The functional part may be, for example, a transmission hydraulic module, a hydraulic control housing, in particular a transmission valve plate, for example of an automatic transmission, a hydraulic unit for a vehicle antilock braking system (ABS hydraulic unit, antilock braking system hydraulic unit), a hydraulic unit for an electronic stability program (ESP), in particular a hydraulic unit for a combined antilock braking system and electronic stability program system (a system which prevents locking of the wheels of a motor vehicle during braking and stabilizes the motor vehicle when there is a risk of skidding), a brake master cylinder, a hydraulic pilot stage and/or main stages for controlling hydraulic clutches, for example in an automatic transmission.

A further subject matter of the present invention is a functional part, in particular manufactured by a method according to the present invention. In particular, the functional part includes:
  a base body made of a first thermoplastic component and
  at least one shell, made of a second thermoplastic component, which has at least one recess and is situated in the base body.

The base body may have, for example, one or multiple ribs and/or different wall thicknesses and/or transverse holes. The shell may have an essentially hollow cylindrical design. The term "essentially hollow cylindrical" means in particular that deviations from an ideal hollow cylinder on the exterior of the shell caused by sink marks in the base body are to be encompassed.

The recess may be a depression or an opening of any given shape and having any given cross-sectional areas, for example polygons, or essentially circular cross-sectional areas. In particular, the recess may be a single opening or a multiple opening. For example, the recess may be a multiple opening having a longitudinal area and one or multiple transverse areas which open into the longitudinal area, and/or one or multiple transverse areas which intersect the longitudinal area. For example, the recess may have a shape similar to a cross or a multiple cross, for example a double cross.

However, the recess may also be a single borehole or a multiple borehole, in particular a long single borehole or a long multiple borehole. For example, in a "long borehole" the ratio of the length of the borehole to the diameter of the borehole may be 4:1 to 10:1.

For example, the borehole may be a cylindrical single borehole or a multiple borehole. Thus, the borehole may have a depression or an opening having a circular cross-sectional area. For a multiple borehole, "cylindrical" in particular may be understood to mean that the individual boreholes of the multiple borehole are cylindrical, whereby the opening areas or intersection areas of the individual boreholes may have a different shape, for example in the form of a structure composed of two or more cylinder-like units which merge together. For example, the borehole may be a single borehole or a multiple borehole for a piston which is movable and freely rotatable along a borehole axis.

In particular, the borehole may be a single borehole or a multiple borehole for a piston which is movable and freely rotatable along a borehole axis. For example, the recess may be a multiple borehole having a longitudinal hole and one or multiple transverse holes which open into the longitudinal hole, and/or one or multiple transverse holes which intersect the longitudinal hole. For a multiple borehole having this type of design, for example a fluid may flow into and/or out of the longitudinal hole, whereby the transverse holes may be completely or partially opened and/or closed by a piston which is movable in the longitudinal hole. For example, hydraulic volume flows and/or pressures may be controlled and/or regulated with the aid of multiple boreholes having this type of design.

The functional part may also have multiple recesses or boreholes.

In particular, the second thermoplastic component may have a smaller wall thickness than the first thermoplastic component or the shell may have a smaller wall thickness than the base body.

The first and second thermoplastic components may be the same or different. In particular, the first and second thermoplastic components may be different thermoplastic components.

Within the scope of another specific embodiment, the stability, in particular the temperature stability and/or pressure resistance and/or shape stability, of the first thermoplastic component is higher than the stability of the second thermoplastic component.

The first thermoplastic component preferably includes fibers and/or other fillers, for example inorganic and/or organic fillers. In particular, the first thermoplastic component may be a fiber-reinforced thermoplastic component.

For example, the first thermoplastic component may include fibers selected from the group composed of glass fibers, carbon fibers, organic fibers, and mixtures thereof. The fibers may have an average fiber length, for example, of ≥50 µm to ≤10 mm, in particular ≥100 µm to ≤7 mm, for example ≥100 µm to ≤200 µm, and/or an average fiber diameter of ≥2 µm to ≤15 µm, in particular ≥5 µm to ≤12 µm, for example ≥6 µm to ≤10 µm. For example, the first component may include ≥10 percent by weight to ≤70 percent by weight, in particular ≥30 percent by weight to ≤60 percent by weight, for example ≥40 percent by weight to ≤50 percent by weight, of fibers and/or other fillers.

The second thermoplastic component preferably includes at least one liquid crystal polymer (LCP), for example a liquid crystal polymer available from Ticona under the trade name Vectra.

In addition, the second thermoplastic component preferably includes a mineral filling and/or a filling selected from the group composed of graphite, molybdenum disulfide, polytetrafluoroethylene, zinc sulfide, carbon fibers, aramide fibers, and mixtures thereof.

The functional part is preferably a hydraulic functional part, in particular a hydraulic unit, for example for a motor vehicle. In particular, the functional part may be designed for pressure transmission and/or for pressure control for pressures of ≥10 bar to ≤400 bar. The functional part may be, for example, a transmission hydraulic module, a hydraulic control housing, in particular a transmission valve plate, for example of an automatic transmission, a hydraulic unit for a vehicle antilock braking system (ABS hydraulic unit, antilock braking system hydraulic unit), a hydraulic unit for an electronic stability program (ESP), in particular a hydraulic unit for a combined antilock braking system and electronic stability program system (a system which prevents locking of the wheels of a motor vehicle during braking and stabilizes the motor vehicle when there is a risk of skidding), a brake master cylinder, a hydraulic pilot stage and/or main stages for controlling hydraulic clutches, for example in an automatic transmission.

With regard to further features and advantages of the functional part according to the present invention, explicit reference is hereby made to the explanations in conjunction with the method according to the present invention for manufacturing a functional part.

Moreover, the present invention relates to the use of a functional part manufactured according to the present invention, or use of a functional part according to the present invention as a hydraulic functional part, in particular as a hydraulic unit, for example for a motor vehicle. In particular, these types of functional parts may be used as a transmission hydraulic module, a hydraulic control housing, in particular a transmission valve plate, for example of an automatic transmission, a hydraulic unit for a vehicle antilock braking system (ABS hydraulic unit, antilock braking system hydraulic unit), a hydraulic unit for an electronic stability program (ESP), in particular a hydraulic unit for a combined antilock braking system and electronic stability program system (a system which prevents locking of the wheels of a motor vehicle during braking and stabilizes the motor vehicle when there is a risk of skidding), a brake master cylinder, a hydraulic pilot stage and/or main stages for controlling hydraulic clutches, for example in an automatic transmission.

DETAILED DESCRIPTION OF THE INVENTION

Figure 1A:
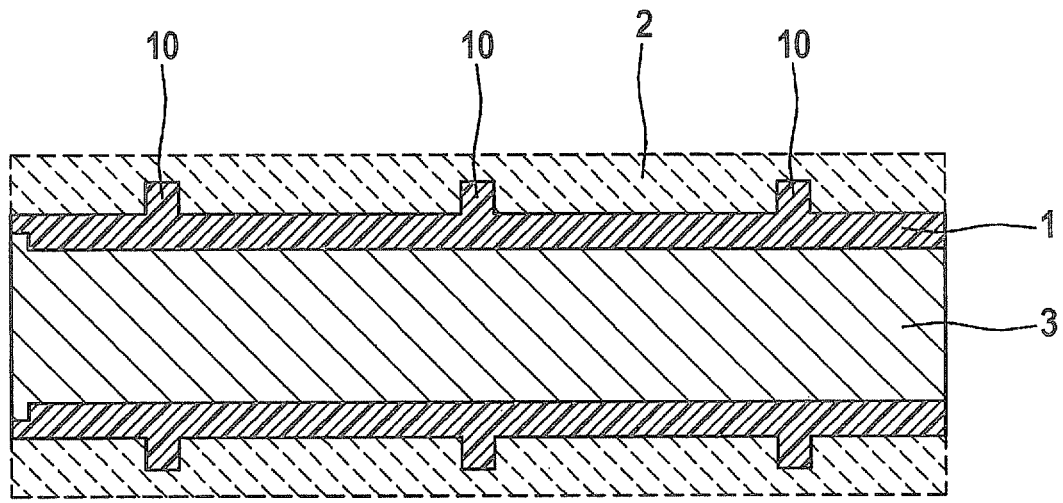
FIG. 1a shows a longitudinal section of an injection mold according to method step a).
Figure 1B:
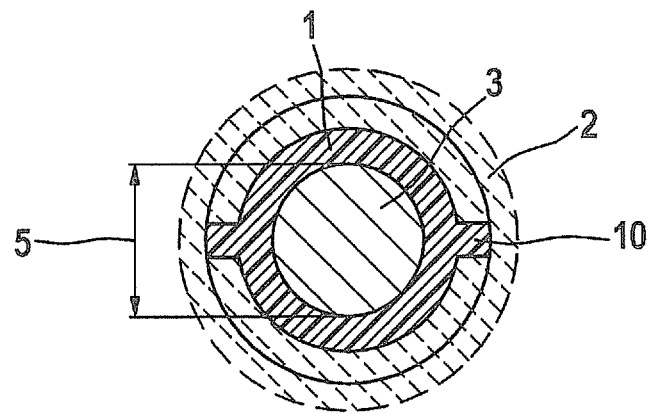
FIG. 1b shows a cross section of an injection mold according to method step a).

FIGS. 1a) and 1b) show that in method step a) a first thermoplastic component 1 has been injected into an injection mold 2, in the cavity of which a first mold core 3 is situated. Base body 1 may be produced from first thermoplastic component 1 in this way. Base body 1 is preferably made of a strength-optimized fiber-reinforced thermoplastic, and is initially provided with a recess, in particular a borehole, having an oversized dimension 5. FIGS. 1a) and 1b) also show that this base body is provided with ribs 10.

Figure 2A:
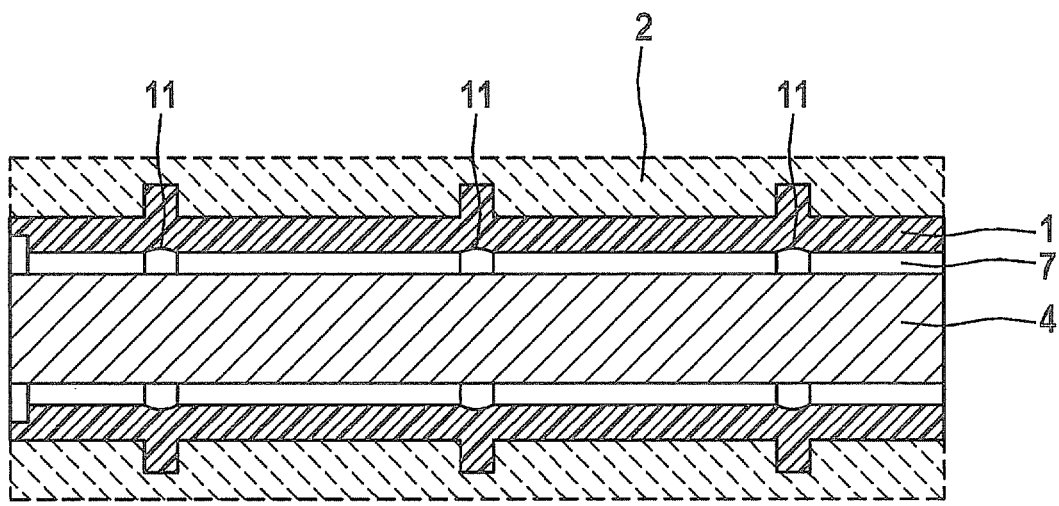
FIG. 2a shows a longitudinal section of an injection mold according to method step b).
Figure 2B:
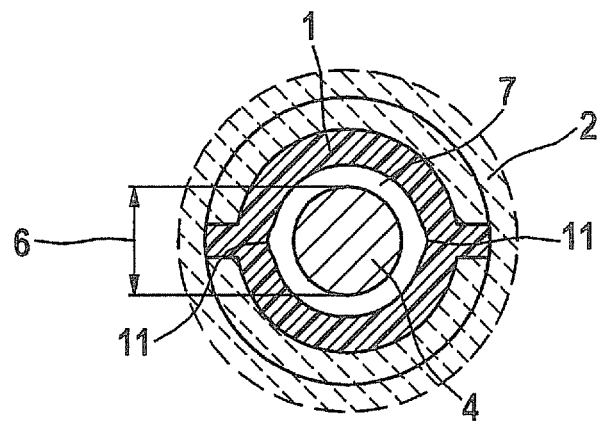
FIG. 2b shows a cross section of an injection mold according to method step b).

FIGS. 2a) and 2b) show that sink marks 11 may develop in base body 1 during or after method step a) as the result of material accumulation at the connections to ribs 10. FIGS. 2a) and 2b) also show that first mold core 3 has been replaced with a second mold core 4 in method step b). External dimension 6 of second mold core 4 is smaller than external dimension 5 of first mold core 3. FIGS. 2a) and 2b) illustrate that second mold core 4 is situated in the cavity formed in first thermoplastic component 1 by first mold core 3 in such a way that second mold core 4 is situated at a distance from first thermoplastic component 1 by a space 7 in-between.

Figure 3A:
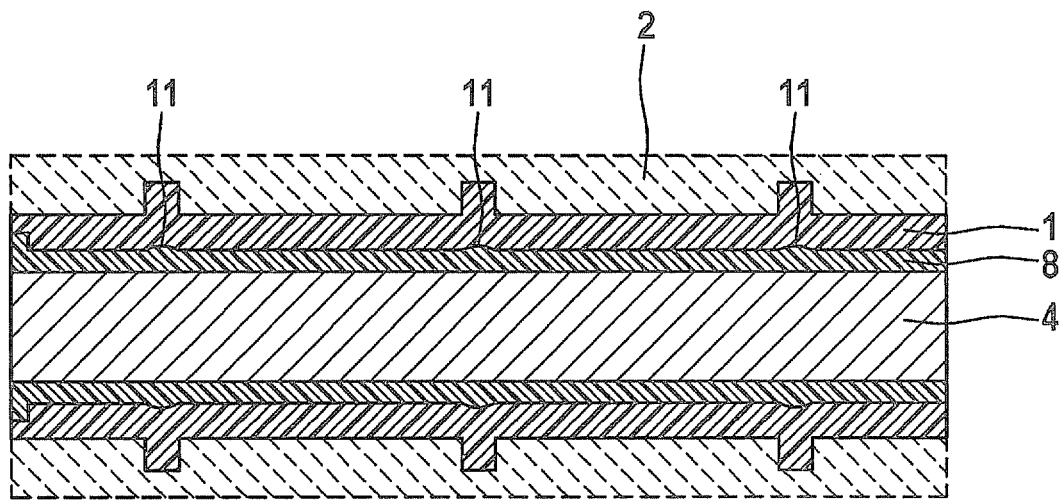
FIG. 3a shows a longitudinal section of an injection mold according to method step c).
Figure 3B:
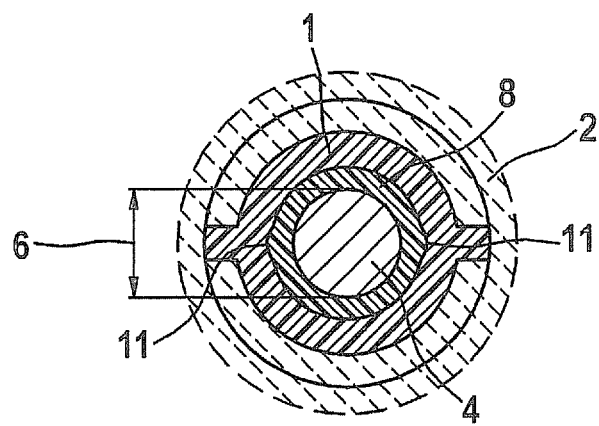
FIG. 3b shows a cross section of an injection mold according to method step c).

FIGS. 3a) and 3b) show that a second thermoplastic component 8 has been injected into space 7 between second mold core 4 and first thermoplastic component 1 in method step c). Recess, in particular borehole, 9 is thus provided with the desired final dimension 6 in the second injection molding operation.

Figure 4A:
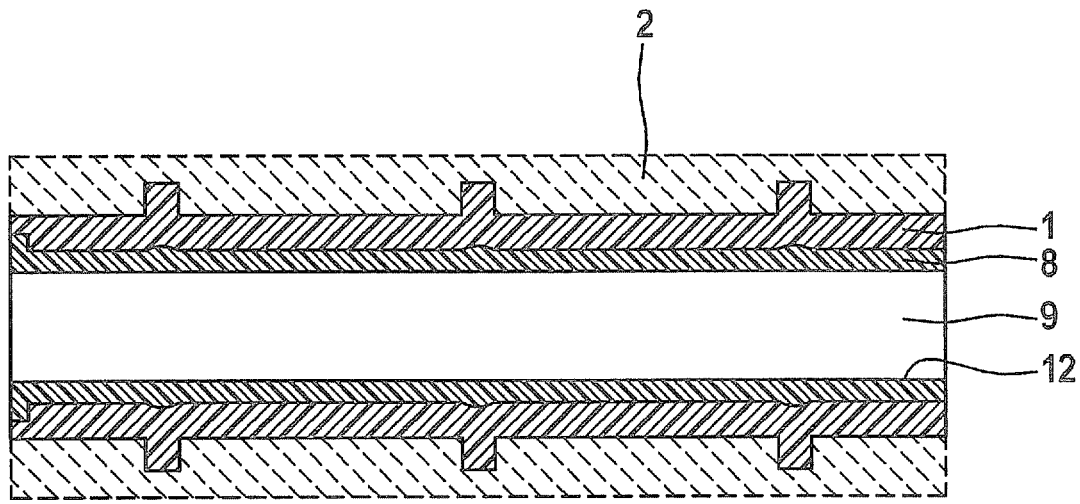
FIG. 4a shows a longitudinal section of an injection mold according to method step d).
Figure 4B:
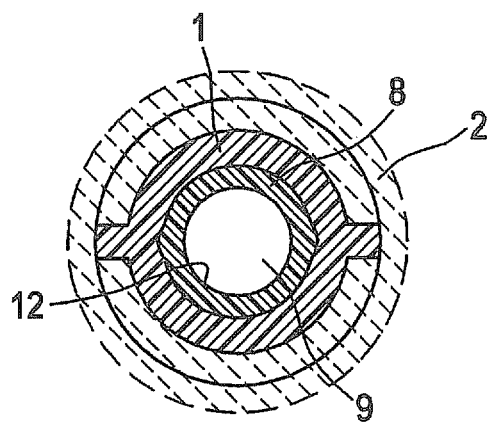
FIG. 4b shows a cross section of an injection mold according to method step d).

FIGS. 4a) and 4b) show that second mold core 4 has been removed in method step d), forming recess, in particular borehole, 9. FIGS. 4a) to 4b) illustrate that, as the result of injecting second thermoplastic component 8 as a shell 8, the sink marks in base body 1 made of first thermoplastic component 1 have been compensated for, and inner wall 12 of shell 8 advantageously has no sink marks.

What is claimed is:

1. An injection molding method for manufacturing a hydraulic functional part having a recess, which is a single borehole or multi-borehole for a piston which is movable and freely rotatable along a borehole axis, comprising:
    a) injecting a first thermoplastic component having at least one outside-lying rib into an injection mold having a first cavity in which a first mold core is situated;
    b) replacing the first mold core with a second mold core, the external dimension of the second mold core being smaller than the external dimension of the first mold core, and the second mold core being situated in a second cavity formed in the first thermoplastic component by the first mold core in such a way that the second mold core is situated at a distance from the first thermoplastic component by an intervening space;
    c) injecting a second thermoplastic component into the intervening space between the second mold core and the first thermoplastic component; and
    d) removing the second mold core while forming the recess.

2. The method as recited in claim 1, wherein the second mold core is centrally situated in the second cavity formed in the first thermoplastic component by the first mold core.

3. The method as recited in claim 2, wherein at least one of the first mold core and the second mold core has a draft angle.

4. The method as recited in claim 2, wherein at least one of the first mold core and the second mold core has an anti-friction coating.

5. The method as recited in claim 2, wherein the distance between the first cavity in the injection mold and the first mold core is greater than the distance between the second mold core and the second cavity formed in the first thermoplastic component by the first mold core.

6. The method as recited in claim 5, wherein the first thermoplastic component and the second thermoplastic component are different thermoplastic components.

7. The method as recited in claim 6, wherein:
    the first thermoplastic component is optimized with respect to structural mechanical requirements; and
    the second thermoplastic component is optimized with respect to requirements for borehole geometry and for field of application of the borehole.

8. The method as recited in claim 6, wherein at least one of:
    (i) the first thermoplastic component includes fibers; and
    (ii) the second thermoplastic component includes at least one of a mineral filling, graphite, molybdenum disulfide, polytetrafluoroethylene, zinc sulfide, carbon fibers, and aramide fibers.

9. The method as recited in claim 6, wherein the second thermoplastic component includes at least one liquid crystal polymer.

\* \* \* \* \*